United States Patent
Welk et al.

(10) Patent No.: US 12,286,689 B2
(45) Date of Patent: Apr. 29, 2025

(54) TITANIUM ALLOYS FOR ADDITIVE MANUFACTURING

(71) Applicant: Ohio State Innovation Foundation, Columbus, OH (US)

(72) Inventors: Brian Welk, Columbus, OH (US); Hamish Fraser, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

(21) Appl. No.: 17/232,925

(22) Filed: Apr. 16, 2021

(65) Prior Publication Data
US 2021/0238712 A1 Aug. 5, 2021

Related U.S. Application Data

(62) Division of application No. 15/905,531, filed on Feb. 26, 2018, now abandoned.
(Continued)

(51) Int. Cl.
*C22C 14/00* (2006.01)
*B22F 1/052* (2022.01)
(Continued)

(52) U.S. Cl.
CPC .............. *C22C 14/00* (2013.01); *B22F 1/052* (2022.01); *B22F 10/28* (2021.01); *B22F 10/34* (2021.01);
(Continued)

(58) Field of Classification Search
CPC ..... C22C 14/00; C22C 1/0458; B23K 26/342; B23K 35/325; B23K 26/34; B23K 26/354; B23K 2103/14; B22F 1/0014; B22F 3/1055; B22F 2999/00; B22F 2301/205; B33Y 70/00; B33Y 10/00
See application file for complete search history.

(56) References Cited

U.S. PATENT DOCUMENTS

| | | | |
|---|---|---|---|
| 4,863,538 | A | 9/1989 | Deckard |
| 4,944,817 | A | 7/1990 | Bourell et al. |

(Continued)

FOREIGN PATENT DOCUMENTS

| | | |
|---|---|---|
| CN | 106420119 | 2/2017 |
| CN | 107058799 A | 8/2017 |

(Continued)

OTHER PUBLICATIONS

Wu et al., "Microstructures of laser-deposited Ti—6l—4V," Materials and Design, 25 (2004), pp. 137-144. (Year: 2004).*

(Continued)

*Primary Examiner* — John A Hevey
(74) *Attorney, Agent, or Firm* — Meunier Carlin & Curfman LLC

(57) ABSTRACT

Disclosed are titanium alloys for use in additive manufacturing that comprise a titanium material and a beta eutectoid stabilizer. The beta eutectoid stabilizer can be present in an effective amount to produce an equiaxed grain structure when the titanium alloy is melted or sintered during an additive manufacturing process. Also provided are methods of forming objects via additive manufacturing processes as well as methods of forming titanium alloys for use in additive manufacturing.

10 Claims, 18 Drawing Sheets

Related U.S. Application Data

(60) Provisional application No. 62/463,338, filed on Feb. 24, 2017.

(51) Int. Cl.

| | | |
|---|---|---|
| *B22F 10/25* | (2021.01) | |
| *B22F 10/28* | (2021.01) | |
| *B22F 10/34* | (2021.01) | |
| *B23K 26/34* | (2014.01) | |
| *B23K 26/342* | (2014.01) | |
| *B23K 26/354* | (2014.01) | |
| *B23K 35/32* | (2006.01) | |
| *B33Y 10/00* | (2015.01) | |
| *B33Y 70/00* | (2020.01) | |
| *C22C 1/04* | (2023.01) | |
| *B23K 103/14* | (2006.01) | |

(52) U.S. Cl.
CPC ............ *B23K 26/34* (2013.01); *B23K 26/342* (2015.10); *B23K 26/354* (2015.10); *B23K 35/325* (2013.01); *B33Y 70/00* (2014.12); *B22F 10/25* (2021.01); *B22F 2301/205* (2013.01); *B22F 2999/00* (2013.01); *B23K 2103/14* (2018.08); *B33Y 10/00* (2014.12); *C22C 1/0458* (2013.01)

(56) References Cited

U.S. PATENT DOCUMENTS

| | | | |
|---|---|---|---|
| 5,017,753 | A | 5/1991 | Deckard |
| 5,076,869 | A | 12/1991 | Bourell et al. |
| 6,143,378 | A | 11/2000 | Harwell et al. |
| 7,073,561 | B1 | 7/2006 | Henn |
| 2006/0045789 | A1 | 3/2006 | Nasserrafi et al. |
| 2011/0048582 | A1 | 3/2011 | Sawada et al. |
| 2012/0107132 | A1 | 5/2012 | Thomas et al. |
| 2014/0061974 | A1 | 3/2014 | Tyler |
| 2014/0116581 | A1 | 5/2014 | Sanz et al. |
| 2017/0016103 | A1* | 1/2017 | Thomas ................ C22C 14/00 |
| 2017/0067137 | A1 | 3/2017 | Kawasaki et al. |
| 2017/0306449 | A1* | 10/2017 | Lin ........................ B22F 10/20 |
| 2017/0306450 | A1* | 10/2017 | Lin ...................... B23K 26/342 |

FOREIGN PATENT DOCUMENTS

| | | |
|---|---|---|
| CN | 105522151 | 3/2019 |
| EP | 3449025 | 3/2019 |
| JP | 2006-070362 | 3/2006 |
| JP | 2007-090432 | 4/2007 |
| WO | 2016140064 | 9/2016 |
| WO | 2017189460 | 11/2017 |
| WO | 2018162920 A1 | 9/2018 |

OTHER PUBLICATIONS

Frazier, "Metal additive manufacturing: A review." Journal of Materials Engineering and Performance 23, No. 6, 2014, pp. 1917-1928.
ASTM E112-12, "Standard Test Methods for Determining Average Grain Size", 2012.
International Search Report and Written Opinion issued for International Application No. PCT/US2018/019749, dated May 4, 2018.
Wang, et al., "Grain morphology evolution behavior of titanium allow components during laser melting deposition additive manufacturing", Journal of Alloys and Compounds, vol. 632, 2015, pp. 506-507.
Extended European Search Report issued by the European Patent Office in Application No. EP18758167.3 on Oct. 15, 2020. 9 pages.
Office Action issued by Japanese Patent Office in Application No. 2019-546229 on Jan. 6, 2022 with English Translation.
Canadian Intellectual Property Office. Office Action. Issued in Canadian Application No. 3054729. Feb. 22, 2024. 5 pages.
European Patent Office. Communication pursuant to Article 94(3) EPC. Issued in European Application No. 18758167.3. Feb. 8, 2024. 7 pages.

* cited by examiner

* Composition – Ti-5.71Al-3.81Mo-5.53V-2.23Cr-4.44Fe (wt%)
* Beta grains times random value = 3.977

- Composition – Ti-5.71Al-3.81Mo-5.53V-2.23Cr-4.44Fe (wt%)
- Beta grains times random value = 3.977

- Composition – Ti-5.64Al-3.82Mo-5.58V-2.25Cr-0.77Fe-2.41Ni (wt%)
- Beta grains times random value = 5.477

- Composition – Ti-5.89Al-4.06V-5.90Fe (wt%)
- Beta grains times random value = 4.066

- Composition – Ti-5.79Al-4.01V-7.43Fe (wt%)
- Beta grains times random value = 3.976

- Composition – Ti-5.79Al-4.01V-7.43Fe (wt%)
- Beta grains times random value = 3.976

- Composition – Ti-6.30Al-4.00V-3.47Ni (wt%)

- Composition – Ti-7.75Fe (wt%)
- beta grains times random value = 4.689

- Composition – Ti-7.75Fe (wt%)
- beta grains times random value = 4.689

- Composition – Ti-14.74Fe (wt%)
- beta grains times random value = 3.871

- Composition – Ti-14.74Fe (wt%)
- beta grains times random value = 3.871

- Composition – Ti-4.35Fe-2.00Ni (wt%)
- Beta grains times random value = 7.855

- Composition – Ti-4.35Fe-2.00Ni (wt%)
- Beta grains times random value = 7.855

TITANIUM ALLOYS FOR ADDITIVE MANUFACTURING

CROSS-REFERENCE TO RELATED APPLICATIONS

This application claims benefit of U.S. Provisional Application No. 62/463,338, filed Feb. 24, 2017, which is hereby incorporated herein by reference in its entirety.

BACKGROUND

"Additive manufacturing" (AM), also known as 3D free form manufacturing, digital manufacturing, direct metal deposition, shaped metal deposition, etc., refers to a process of joining materials to make three-dimensional (3D) objects as opposed to subtractive manufacturing methodologies, such as machining. 3D printing represents one form of additive manufacturing. Additive manufacturing includes incremental additions of materials in designated locations, often one layer at a time. A "build direction" of the object refers to the direction in which the incremental materials are successively added or stacked. Known apparatuses for additive manufacturing include powder bed systems, powder feed systems, wire feed systems, etc., such as described in Frazier, William E. "Metal additive manufacturing: A review." Journal of Materials Engineering and Performance 23, no. 6 (2014): 1917-1928, incorporated herein by reference.

Additive manufacturing presents benefits over known processes intended to manufacture complex parts from costly materials, such as metal alloys. Additive manufacturing allows significant reduction in scrap produced using subtractive manufacturing. Instead of machining a part from a work piece of solid material, additive manufacturing uses the amount or nearly the amount of material needed to yield a net-shape or near net-shape part.

Even so, objects produced from additive manufacturing exhibit unique metallurgical and mechanical properties. Although dimensions of an additive manufactured part may be accurately and precisely produced within tolerances, the part may lack the mechanical properties desired given the incremental additions of material. As a result, further additive manufacturing techniques are desired that enhance metallurgical and/or mechanical properties.

SUMMARY

As shown in FIG. 1A, AM of traditional titanium alloys produces coarse columnar grains. The coarse columnar grains produce undesirable anisotropic mechanical properties in AM components. To break down the columnar structure, post deposition HIP'ing or heat-treatments are performed which adds another step (and cost) to the manufacturing process and limits placing the as-deposited component directly into service. This is limiting the full exploitation of titanium alloy additive manufactured components.

By modifying pure commercially pure titanium (CP Ti) or existing titanium alloys with alloying additions, the columnar grain structure in AM titanium components can be reduced or eliminated. Specifically, by incorporating an effective amount of a beta cutectoid stabilizer, one can form titanium alloys which produce an equiaxed grain structure when melted or sintered during an additive manufacturing process. Using these alloys, the anisotropic mechanical properties of AM components can be reduced or eliminated.

As discussed above, builds produced using existing titanium alloys are typically post-deposition HIP'ed and/or heat-treated to breakdown their columnar grain structure. However, by incorporating beta cutectoid stabilizer in the titanium alloy, the columnar grain structure (and by extension the anisotropic mechanical properties) of the build can be reduced or eliminated. Therefore, builds can be put directly into service without the need for extra post-deposition steps, saving time and money.

Accordingly, provided herein are titanium alloys for use in additive manufacturing that comprise a titanium material and a beta cutectoid stabilizer. The beta cutectoid stabilizer can be present in an effective amount to produce an equiaxed grain structure when the titanium alloy is melted or sintered during an additive manufacturing process.

The titanium alloy can be in the form of a population of particles having an average particle size suitable for use in conjunction with an additive manufacturing process (e.g., an average particle size of less than about 250 microns). For example, in some embodiments, the titanium alloy can be in the form of a population of particles having an average particle size of from 5 microns to 200 microns (e.g., from 25 microns to 150 microns, or from 50 microns to 150 microns). The beta cutectoid stabilizer can be present in an amount of from 2% to 20% by weight (e.g., greater than 3% to 15% by weight), based on the total weight of the titanium alloy.

In some embodiments, the beta cutectoid stabilizer can be chosen from Fe, Ni, Cu, or a combination thereof. In some embodiments, the beta cutectoid stabilizer can comprise Fe. In some of these embodiments, the Fe can be present in an amount of from 3% to 15% by weight (e.g., from 4% to 6% by weight), based on the total weight of the titanium alloy. In some embodiments, the beta cutectoid stabilizer can comprise Cu. In some of these embodiments, the Cu can be present in an amount of from 3.5% to 10% by weight (e.g., from 4% to 6% by weight), based on the total weight of the titanium alloy. In some embodiments, the beta eutectoid stabilizer can comprise Ni. In some of these embodiments, the Ni can be present in an amount of from 2% to 12% by weight (e.g., from 3% to 6% by weight), based on the total weight of the titanium alloy.

The titanium material can comprise commercially pure titanium metal or a titanium alloy (e.g., a commercially available titanium alloy). In some embodiments, the titanium material can comprise at least 75% by weight titanium, based on the total weight of the titanium material. In certain embodiments, the titanium material is commercially pure titanium. In other embodiments, the titanium material is a commercially available titanium alloy (e.g., Ti64 (Ti-6Al-4V), Ti18 (Ti-5.5Al-5Mo-5V-2.3Cr-0.8Fe), or a combination thereof).

As discussed above, the titanium alloys described herein can produce an equiaxed grain structure when melted or sintered during an additive manufacturing process. In some embodiments, the titanium alloys described herein can provide objects (builds) that exhibit an average grain aspect ratio of less than 2.5, such as from 1.5 to 2.25. In some embodiments, the titanium alloys described herein can provide objects (builds) having grains, and at least 85% of the grains have an aspect ratio of less than 3:1.

Also provided are methods of forming objects via additive manufacturing processes as well as methods of forming titanium alloys for use in additive manufacturing.

DETAILED DESCRIPTION

Figure 1A:
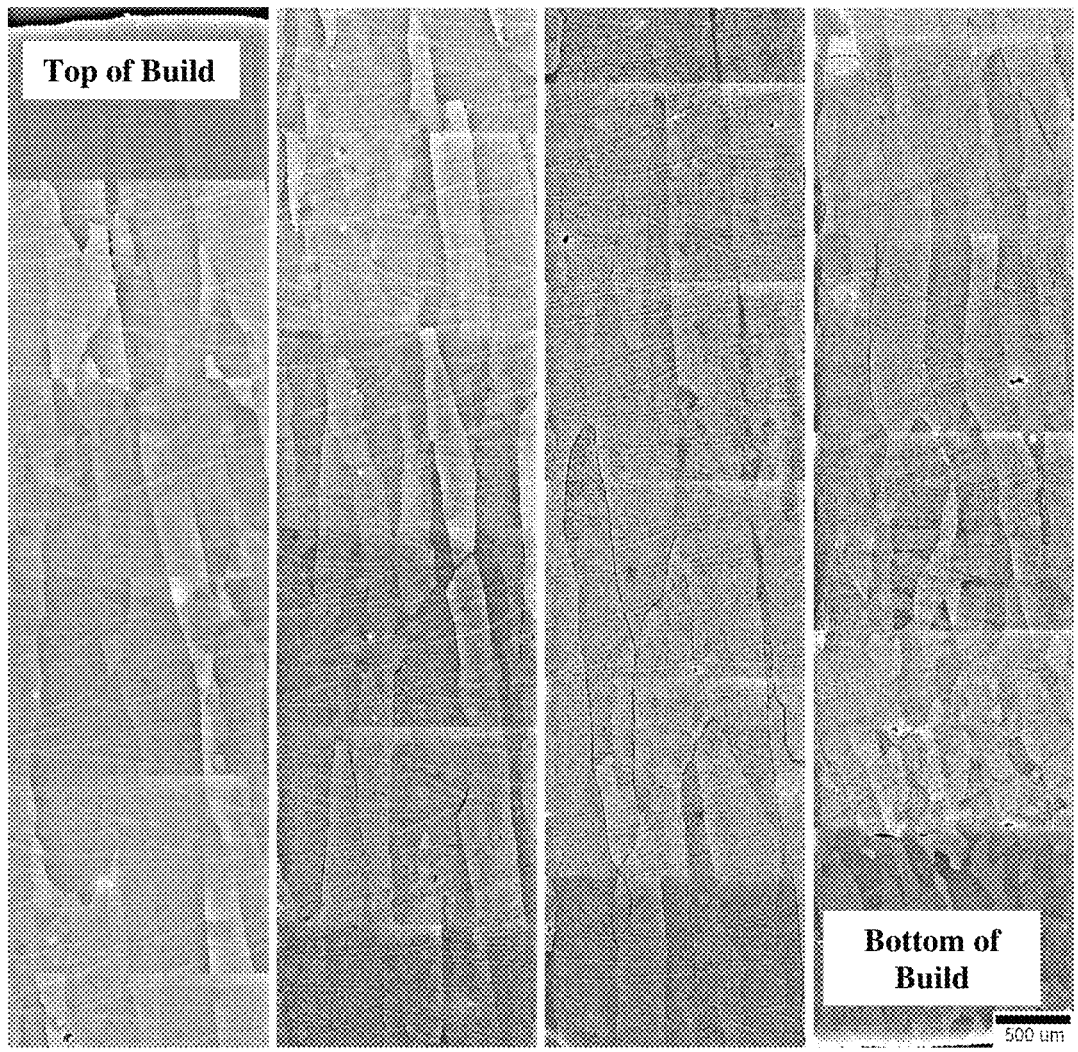
FIG. 1A shows the columnar grain structure of a build formed by AM using a conventional commercially available titanium alloy (Ti18; Ti-5.5Al-5Mo-5V-2.3Cr-0.8Fe).

Disclosed herein are titanium alloys for use in additive manufacturing. The titanium alloys can comprise a titanium material and a beta eutectoid stabilizer.

In some embodiments, the titanium alloy can comprise at least 50% by weight (e.g., at least 55% by weight, at least 60% by weight, at least 65% by weight, at least 70% by weight, at least 75% by weight, at least 80% by weight, at least 85% by weight, or at least 90% by weight) titanium, based on the total weight of the titanium alloy. In some embodiments, the titanium alloy can comprise 95% by weight or less (e.g., 90% by weight or less, 85% by weight or less, 80% by weight or less, 75% by weight or less, 70% by weight or less, 65% by weight or less, 60% by weight or less, or 55% by weight or less) titanium, based on the total weight of the titanium alloy.

The titanium alloy can comprise an amount of titanium ranging from any of the minimum values described above to any of the maximum values described above. For example, in some embodiments, the titanium alloy can comprise from 50% by weight to 95% by weight titanium (e.g., from 70% by weight to 90% by weight titanium), based on the total weight of the titanium alloy.

The titanium alloy can be in the form of a population of particles suitable for use in an AM process. For example, the titanium alloy can be in the form of a population of particles having an average particle size of less than about 250 microns (e.g., less than 225 microns, less than 200 microns, less than 175 microns, less than 150 microns, less than 125 microns, less than 100 microns, less than 75 microns, less than 50 microns, less than 25 microns, less than 20 microns, or less than 10 microns). The titanium alloy can be in the form of a population of particles having an average particle size of at least 5 microns (e.g., at least 10 microns, at least 20 microns, at least 25 microns, at least 50 microns, at least 75 microns, at least 100 microns, at least 125 microns, at least 150 microns, at least 175 microns, at least 200 microns, or at least 225 microns).

The titanium alloy can be in the form of a population of particles having an average particle size ranging from any of the minimum values described above to any of the maximum values described above. For example, in some embodiments, the titanium alloy can be in the form of a population of particles having an average particle size of from 5 microns to 200 microns (e.g., from 25 microns to 150 microns, or from 50 microns to 150 microns). The average particle size of a population of particles can be measured using, for example, dynamic light scattering.

Beta eutectoid stabilizers are known in the art, and include Fe, Ni, Cu, Cr, Si, Mn, W, Pd, and Bi. In some embodiments, the beta eutectoid stabilizer is chosen from Fe, Ni, Cu, or a combination thereof. In some embodiments, only a single beta eutectoid stabilizer can be incorporated into the titanium alloy. In other embodiments, a combination of two beta eutectoid stabilizers can be incorporated into the titanium alloy. In other embodiments, a combination of three beta eutectoid stabilizers can be incorporated into the titanium alloy. In other embodiments, a combination of four beta eutectoid stabilizers can be incorporated into the titanium alloy.

The beta eutectoid stabilizers can be present in the titanium alloy in an effective amount to produce an equiaxed grain structure when the titanium alloy is melted or sintered during an additive manufacturing process. In some embodiments, the beta eutectoid stabilizers can be present in an amount of at least 2% by weight (e.g., at least 2.25% by weight, at least 2.5% by weight, at least 2.75% by weight, at least 3% by weight, at least 3.25% by weight, at least 3.5% by weight, at least 3.75% by weight, at least 4% by weight, at least 4.25% by weight, at least 4.5% by weight, at least 4.75% by weight, at least 5% by weight, at least 6% by weight, at least 7% by weight, at least 8% by weight, at least 9% by weight, at least 10% by weight, at least 11% by weight, at least 12% by weight, at least 13% by weight, at least 14% by weight, or at least 15% by weight), based on the total weight of the titanium alloy. In some embodiments, the beta eutectoid stabilizers can be present in an amount of 20% by weight or less (e.g., 15% by weight or less, 14% by weight or less, 13% by weight or less, 12% by weight or less, 11% by weight or less, 10% by weight or less, 9% by weight or less, 8% by weight or less, 7% by weight or less, 6% by weight or less, 5% by weight or less, 4.75% by weight or less, 4.5% by weight or less, 4.25% by weight or less, 4% by weight or less, 3.75% by weight or less, 3.5% by weight or less, 3.25% by weight or less, 3% by weight or less, 2.75% by weight or less, 2.5% by weight or less, or 2.25% by weight or less), based on the total weight of the titanium alloy.

The beta eutectoid stabilizers can be present in the titanium alloy in an amount ranging from any of the minimum values described above to any of the maximum values described above. For example, in some embodiments, the beta eutectoid stabilizers can be present in an amount of from 2% to 20% by weight (e.g., greater than 3% to 15% by weight), based on the total weight of the titanium alloy.

In some embodiments, the beta eutectoid stabilizer can comprise iron. In certain embodiments, the beta eutectoid stabilizer can consist of iron. In other embodiments, the beta eutectoid stabilizer can comprise iron in combination with an additional beta eutectoid stabilizer (e.g., Ni or Cu). In other embodiments, the beta eutectoid stabilizer can comprise iron in combination with two additional beta eutectoid stabilizers (e.g., Ni and Cu). In other embodiments, the beta eutectoid stabilizer can comprise iron in combination with three or more additional beta eutectoid stabilizers.

In some embodiments, Fe can be present in an amount of at least 3% by weight (e.g., at least 3.25% by weight, at least 3.5% by weight, at least 3.75% by weight, at least 4% by weight, at least 4.25% by weight, at least 4.5% by weight, at least 4.75% by weight, at least 5% by weight, at least 6% by weight, at least 7% by weight, at least 8% by weight, at least 9% by weight, at least 10% by weight, at least 11% by weight, at least 12% by weight, at least 13% by weight, at least 14% by weight, or at least 15% by weight), based on the total weight of the titanium alloy. In some embodiments, Fe can be present in an amount of 15% by weight or less (e.g., 14% by weight or less, 13% by weight or less, 12% by weight or less, 11% by weight or less, 10% by weight or less, 9% by weight or less, 8% by weight or less, 7% by weight or less, 6% by weight or less, 5% by weight or less, 4.75% by weight or less, 4.5% by weight or less, 4.25% by weight or less, 4% by weight or less, 3.75% by weight or less, 3.5% by weight or less, or 3.25% by weight or less), based on the total weight of the titanium alloy.

Iron can be present in the titanium alloy in an amount ranging from any of the minimum values described above to any of the maximum values described above. For example, in some embodiments, Fe can be present in an amount of from 3% to 15% by weight (e.g., from 4% to 6% by weight), based on the total weight of the titanium alloy.

In some embodiments, the beta eutectoid stabilizer can comprise copper. In certain embodiments, the beta eutectoid stabilizer can consist of copper. In other embodiments, the beta eutectoid stabilizer can comprise copper in combination with an additional beta eutectoid stabilizer (e.g., Ni or Fe). In other embodiments, the beta eutectoid stabilizer can comprise copper in combination with two additional beta eutectoid stabilizers (e.g., Ni and Fe). In other embodiments, the beta eutectoid stabilizer can comprise copper in combination with three or more additional beta eutectoid stabilizers.

In some embodiments, Cu can be present in an amount of at least 3.5% by weight (e.g., at least 3.75% by weight, at least 4% by weight, at least 4.25% by weight, at least 4.5% by weight, at least 4.75% by weight, at least 5% by weight, at least 6% by weight, at least 7% by weight, at least 8% by weight, at least 9% by weight, at least 10% by weight, at least 11% by weight, at least 12% by weight, at least 13% by weight, at least 14% by weight, or at least 15% by weight), based on the total weight of the titanium alloy. In some embodiments, Cu can be present in an amount of 10% by weight or less (e.g., 9% by weight or less, 8% by weight or less, 7% by weight or less, 6% by weight or less, 5% by weight or less, 4.75% by weight or less, 4.5% by weight or less, 4.25% by weight or less, 4% by weight or less, or 3.75% by weight or less), based on the total weight of the titanium alloy.

Copper can be present in the titanium alloy in an amount ranging from any of the minimum values described above to any of the maximum values described above. For example, in some embodiments, Cu can be present in an amount of from 3.5% to 10% by weight (e.g., from 4% to 6% by weight), based on the total weight of the titanium alloy.

In some embodiments, the beta eutectoid stabilizer can comprise nickel. In certain embodiments, the beta eutectoid stabilizer can consist of nickel. In other embodiments, the beta eutectoid stabilizer can comprise nickel in combination with an additional beta eutectoid stabilizer (e.g., Fe or Cu). In other embodiments, the beta eutectoid stabilizer can comprise nickel in combination with two additional beta eutectoid stabilizers (e.g., Fe and Cu). In other embodiments, the beta eutectoid stabilizer can comprise nickel in combination with three or more additional beta eutectoid stabilizers.

In some embodiments, Ni can be present in an amount of at least 2% by weight (e.g., at least 2.25% by weight, at least 2.5% by weight, at least 2.75% by weight, at least 3% by weight, at least 3.25% by weight, at least 3.5% by weight, at least 3.75% by weight, at least 4% by weight, at least 4.25% by weight, at least 4.5% by weight, at least 4.75% by weight, at least 5% by weight, at least 6% by weight, at least 7% by weight, at least 8% by weight, at least 9% by weight, at least 10% by weight, or at least 11% by weight), based on the total weight of the titanium alloy. In some embodiments, Ni can be present in an amount of 12% by weight or less (e.g., 11% by weight or less, 10% by weight or less, 9% by weight or less, 8% by weight or less, 7% by weight or less, 6% by weight or less, 5% by weight or less, 4.75% by weight or less, 4.5% by weight or less, 4.25% by weight or less, 4% by weight or less, 3.75% by weight or less, 3.5% by weight or less, 3.25% by weight or less, 3% by weight or less, 2.75% by weight or less, 2.5% by weight or less, or 2.25% by weight or less), based on the total weight of the titanium alloy.

Nickel can be present in the titanium alloy in an amount ranging from any of the minimum values described above to any of the maximum values described above. For example, in some embodiments, Ni can be present in an amount of from 2% to 12% by weight (e.g., from 3% to 6% by weight), based on the total weight of the titanium alloy.

The titanium material can comprise any suitable titanium or titanium alloy. In some cases, the titanium material can comprise commercially pure titanium. As used herein, the term "commercially pure titanium" refers to a titanium material in which the amount of titanium is at least about 98% by weight (e.g., at least 98.5% by weight, at least 99% by weight, or at least 99.5% by weight) of the material.

In some embodiments, the titanium material can comprise a titanium alloy. In some embodiments, the titanium material can comprise at least 50% by weight (e.g., at least 55% by weight, at least 60% by weight, at least 65% by weight, at least 70% by weight, at least 75% by weight, at least 80% by weight, at least 85% by weight, at least 90% by weight, or at least 95% by weight) titanium, based on the total weight of the titanium material. In some embodiments, the titanium material can comprise 95% by weight or less (e.g., 90% by weight or less, 85% by weight or less, 80% by weight or less, 75% by weight or less, 70% by weight or less, 65% by weight or less, 60% by weight or less, or 55% by weight or less) titanium, based on the total weight of the titanium material.

The titanium material can comprise an amount of titanium ranging from any of the minimum values described above to any of the maximum values described above. For example, in some embodiments, the titanium material can comprise from 50% by weight to 95% by weight titanium (e.g., from 70% by weight to 90% by weight titanium), based on the total weight of the titanium material.

In certain embodiments, the titanium material can comprise a commercially available titanium alloy. Examples of commercially available titanium alloys are shown in Table 1 below. In certain embodiments, the titanium material can comprise Ti64 (Ti-6Al-4V), Ti18 (Ti-5.5Al-5Mo-5V-2.3Cr-0.8Fe), or a combination thereof.

TABLE 1

Composition of commercially available titanium alloys.

| Alloy | Alloy Composition (wt. %) |
|---|---|
| Ti64 | Ti—6Al—4V |
| Ti18 | Ti—5.5Al—5Mo—5V—2.3Cr—0.8Fe |
| Ti6246 | Ti—6Al—2Sn—4Zr—6Mo |
| Ti6242 | Ti—6Al—2Sn—4Zr—2Mo |
| Ti17 | Ti—5Al—2Sn—4Mo—2Zr—4Cr |
| β21S | Ti—15Mo—3Nb—3Al—0.2Si |
| Ti-10-2-3 | Ti—10V—2Fe—3Al |
| Ti-5111 | Ti—5Al—1Sn—1V—1Zr—1Mo |
| Ti-3-2.5 | Ti—3Al—2.5V |
| Ti62S | Ti—6Al—1.65Fe |
| Ti550 | Ti—4Al—4Mo—2Sn—.5Si |
| NiTi | Ti—55Ni |
| NiTiFe | Ti—53Ni—3.5Fe |

The titanium alloys described herein can be used in a variety of AM processes that employ metallic powders as a feedstock. AM processes include a variety of processes which result in useful, three-dimensional objects and include a step of sequentially forming the shape of the object one layer at a time. Examples of such AM processes include, for example, processes employing powders as a feedstock such as selective laser melting (SLM), selective laser sintering (SLS), electron beam melting (EBM), and electron beam sintering (EBS). Other examples of such AM processes include Powder Directed Energy Deposition methods, such as Laser Engineering Net Shape (LENS) and Laser Metal Deposition-powder (LMD-p) methods. These processes generally provide for the rapid manufacture a three-dimensional object (e.g., an article, component, part, product, etc.) through the sequential formation of a multiplicity of thin unit layers. More specifically, layers of a powder material are laid down and irradiated with an energy beam (e.g., laser beam) so that particles of the powder material within each layer are sequentially sintered (fused) or melted to solidify the layer.

Descriptions of laser sintering/melting technology can be found, for example, in U.S. Pat. Nos. 4,863,538, 5,017,753, 5,076,869, and 4,944,817, each of which are hereby incorporated herein by reference in its entirety. In these methods, a laser beam is used to selectively fuse a powder material by scanning cross-sections of the material in a bed. These cross-sections are scanned based on a three-dimensional description of the desired object. This description may be obtained from various sources such as, for example, a computer aided design (CAD) file, scan data, or some other source. Electron sintering/melting technology operates using similar principles, except that an electron beam is used in place of a laser beam to locally transfer energy to the powder material.

Other examples of additive manufacturing processes that can utilize the titanium alloys described herein include wire-based AM processes (i.e., wire directed energy deposition methods, such as Laser Metal Deposition-wire (LMD-w) and Electron Beam Additive Manufacturing (EBAM®) methods). Such methods are described, for example, in U.S. Pat. Nos. 7,073,561, 6,143,378, and U.S. Pat. Appl. Pub. 2014/0061974, each of which are hereby incorporated herein by reference in its entirety.

Methods of forming objects via additive manufacturing processes can comprise applying energy to a first quantity of a powdered titanium alloy described herein on a substrate so as to fuse particles of the powdered titanium alloy into a first layer on the substrate; and forming at least one additional layer on the first layer by applying energy to at least a second quantity of a powdered titanium alloy described herein on the first layer so as to fuse particles of the powdered titanium alloy into the at least one additional layer on the first layer, thereby forming the object. Applying energy can comprise contacting the powdered titanium alloy with a laser beam or an electron beam (depending upon the additive manufacturing process employed).

Methods of forming objects via additive manufacturing processes can also comprise directing an energy beam and feeding a feedstock comprising a titanium alloy described herein to a feed point adjacent to a substrate, thereby forming a molten puddle; moving the feed point relative to the substrate, thereby advancing the molten puddle of presently fed feedstock and rapidly solidifying previously fed feedstock; and sequentially advancing the feed point within a predetermined geometric volume, thereby sequentially fusing the feedstock, by action of the advancing molten puddle, into a near net shape work piece built-up upon the substrate. In these methods, the feedstock can comprise, for example, a wire formed from a titanium alloy described herein.

As discussed above, by utilizing the titanium alloys described herein, objects that possess an equiaxed grain structure can be formed using an additive manufacturing process (without subsequent treatment steps to eliminate a columnar grain structure). The term "equiaxed grain structure," as used herein, refers to a grain structure that includes a population of grains having an average aspect ratio of 3:1 or less. Standard methods for determining the average grain size of grains present in a metal are known in the art. See, for example, ASTM E112-12, entitled "Standard Test Methods for Determining Average Grain Size," which is hereby incorporated herein by reference in its entirety. The average aspect ratio of grains can be calculated from the grain dimensions obtained using ASTM E112-12.

In some embodiments, the object can exhibit an average grain aspect ratio of less than 2.5:1 (e.g., less than 2.25:1, less than 2:1, less than 1.9:1, less than 1.8:1, less than 1.7:1, less than 1.6:1, less than 1.5:1, less than 1.4:1, less than 1.3:1, or less). In some embodiments, the object can exhibit an average grain aspect ratio of greater than 1:1 (e.g., at least 1.3:1, at least 1.4:1, at least 1.5:1, at least 1.6:1, at least 1.7:1, at least 1.8:1, at least 1.9:1, at least 2:1, or at least 2.25:1). In some embodiments, the object can exhibit an average grain aspect ratio of about 1:1.

The object can exhibit an average grain aspect ratio ranging from any of the minimum values described above to any of the maximum values described above. For example, in some embodiments, the object can exhibit an average grain aspect ratio of from 1.5 to 2.25. In some embodiments, the standard deviation of the average grain aspect ratio can be less than 1.

In some embodiments, the object comprises grains, and at least 85% (e.g., at least 90%, or at least 95%) of the grains have an aspect ratio of less than 3:1. In some embodiments, the object comprises grains, and at least 85% (e.g., at least 90%, or at least 95%) of the grains have an aspect ratio of less than 2.5:1. In some embodiments, the object comprises grains, and at least 85% (e.g., at least 90%, or at least 95%) of the grains have an aspect ratio of less than 2:1.

Also provided herein are methods of forming titanium alloys for use in additive manufacturing. These methods can comprise combining a titanium material with a beta cutectoid stabilizer to form the titanium alloy. The beta cutectoid stabilizer can be added in an effective amount to produce an equiaxed grain structure when the titanium alloy is melted or sintered during an additive manufacturing process. In some embodiments, the method can further comprise micronizing the titanium alloy to form a population of particles suitable for use in an additive manufacturing process.

By way of non-limiting illustration, examples of certain embodiments of the present disclosure are given below.

EXAMPLES

Materials and Methods

An Optomec Laser Engineered Net Shaping (LENS™) additive manufacturing device with two powder feeders was used to deposit single composition and compositionally graded cylinders using pre-alloyed and elemental powders. The pre-alloyed powders included commercially pure titanium (CP Ti), Ti-6Al-4V and Ti18 and the elemental powders were iron, nickel and copper. Custom elemental blend powders, made by mixing the pre-alloyed and elemental powders in the correct ratio for the desired composition, were also used. To deposit the compositional gradient, powder feeder one contained the pre-alloyed powder and powder feeder two contained the elemental blend. The rpm (flow rate control reference for The Ohio State University LENS™) of powder feeder one was set to three and the rpm of powder feeder two was set to zero. During the deposition, the rpm of powder feeder one was decreased while the rpm of powder feeder two was increased by the same amount. The rpm change was done in a stepwise function to create distinct composition layers. The laser power varied between 300W and 325W depending on the composition. The travel speed was set at 20"/min, the layer spacing was 0.010" and the hatch width was 0.015".

After deposition, the specimens were sectioned parallel to the build direction and the plane parallel to the build direction was polished through 0.05 um colloidal silica. The as-deposited specimens were characterized using an FEI Apreo scanning electron microscope (SEM). Backscattered electron (BSE) images were acquired for grain analysis. X-ray energy dispersive spectroscopy (XEDS) was performed using an EDAX Octane Elect silicon-drift detector to determine the sample composition. A Hikari electron backscattered diffraction (EBSD) camera and OIM Data Collection 7.0 was used for acquiring grain orientation data. The orientation data was analyzed using OIM Data Analysis 8.0.

To determine the grain aspect ratio, the individual grains were manually separated along the grain boundary alpha. If there was no grain boundary alpha present, a grain boundary map from the EBSD orientation data was used. Using the image analysis program MIPAR and its Feature Measurements tool, the major axis length and minor axis length of each grain was determined. The aspect ratio was calculated by dividing the major axis length by the minor axis length. All edge grains were removed from the image before quantification. The texture of the beta grains was calculated if more than half of the data points were the beta phase.

Results and Discussion

Figure 1B:
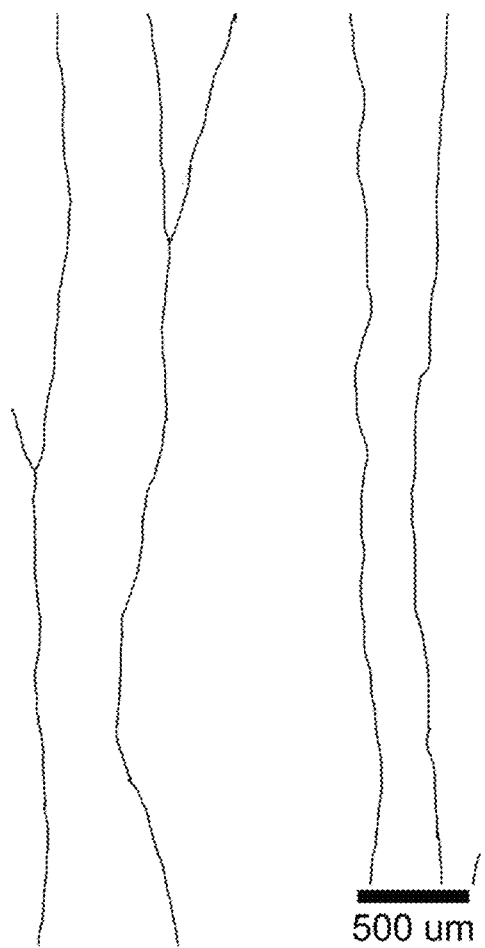
FIG. 1B is a line drawing showing the outline of grains in a portion of the build shown in FIG. 1A.
Figure 2A:
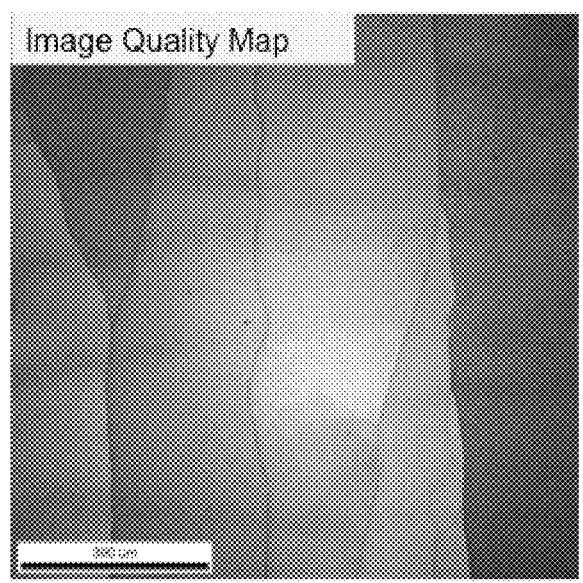
FIG. 2A is an EBSD image quality map showing the grain boundaries in a build formed by AM using Ti18.
Figure 2B:
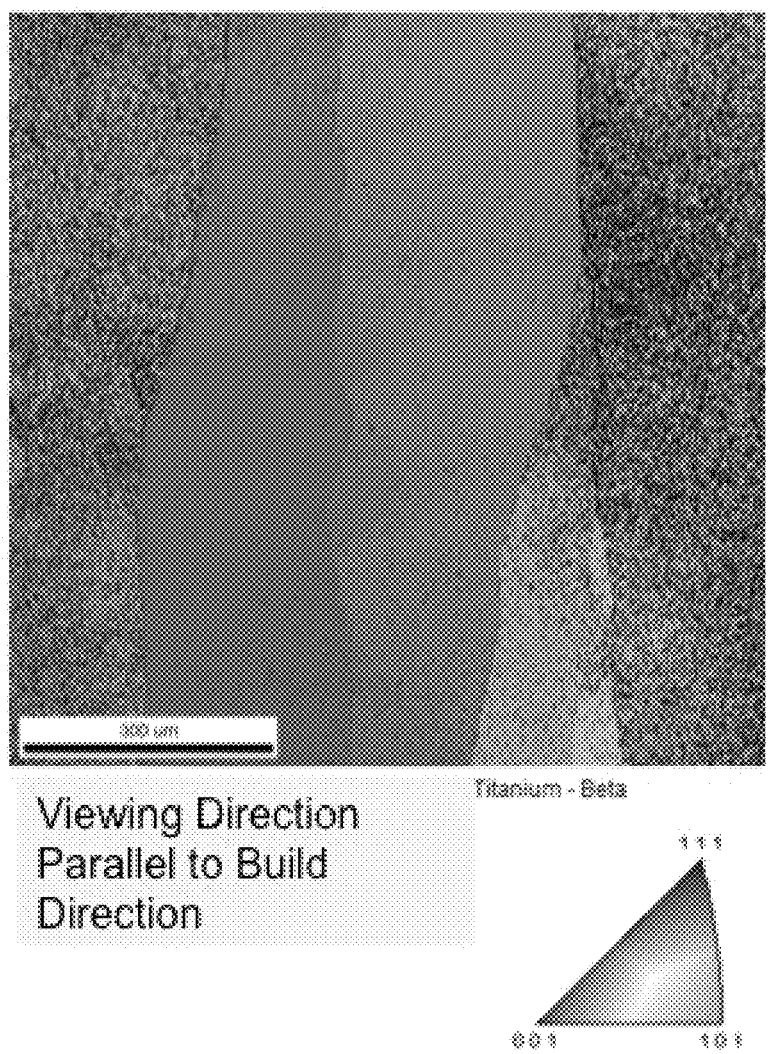
FIG. 2B is an inverse pole figure map showing the orientation of the columnar grains parallel to the build direction in a build formed by AM using Ti18.
Figure 2C:
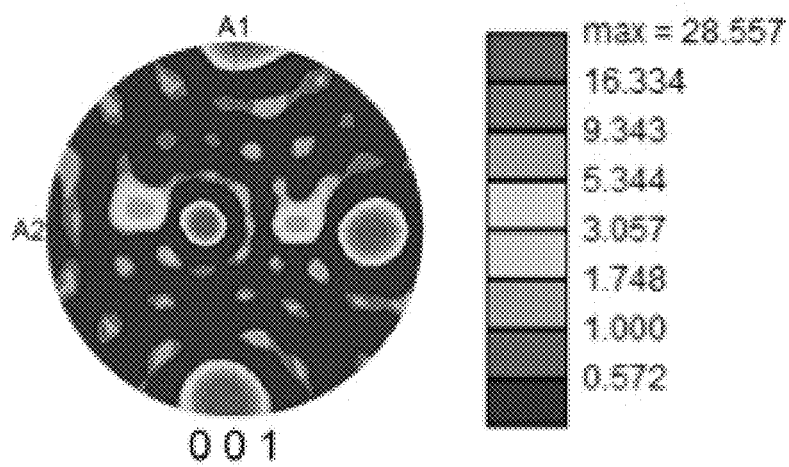
FIG. 2C is a pole figure showing the highly textured columnar grains in a build formed by AM using Ti18.

Additive manufacturing of CP Ti or conventions titanium alloys produces coarse columnar grains as seen in the as-deposited titanium alloy Ti18 (FIGS. 1A and 1B). FIG. 2A is an image quality (IQ) map of as-deposited Ti18. The IQ map is based on the pattern quality of the EBSD data. Lower pattern quality results in a lower IQ value and is therefore a darker point in the IQ map. Grain boundaries typically have low quality and therefore can be used for grain identification. The darker lines in FIG. 2A are the grain boundaries of the columnar grains. FIG. 2B is an inverse pole figure (IPF) map of the selected area. An IPF map shows the grain orientation relative to the sample normal, rolling or transverse direction. The pole figure (FIG. 2C) shows the preferred orientation of the columnar grains with a times random value of 28.6. The times random value is the ratio of the actual measured grain orientation and a calculated truly random grain orientation. The higher the times random value, the greater the amount of texture in the build.

Ti18+Iron

Figure 3A:
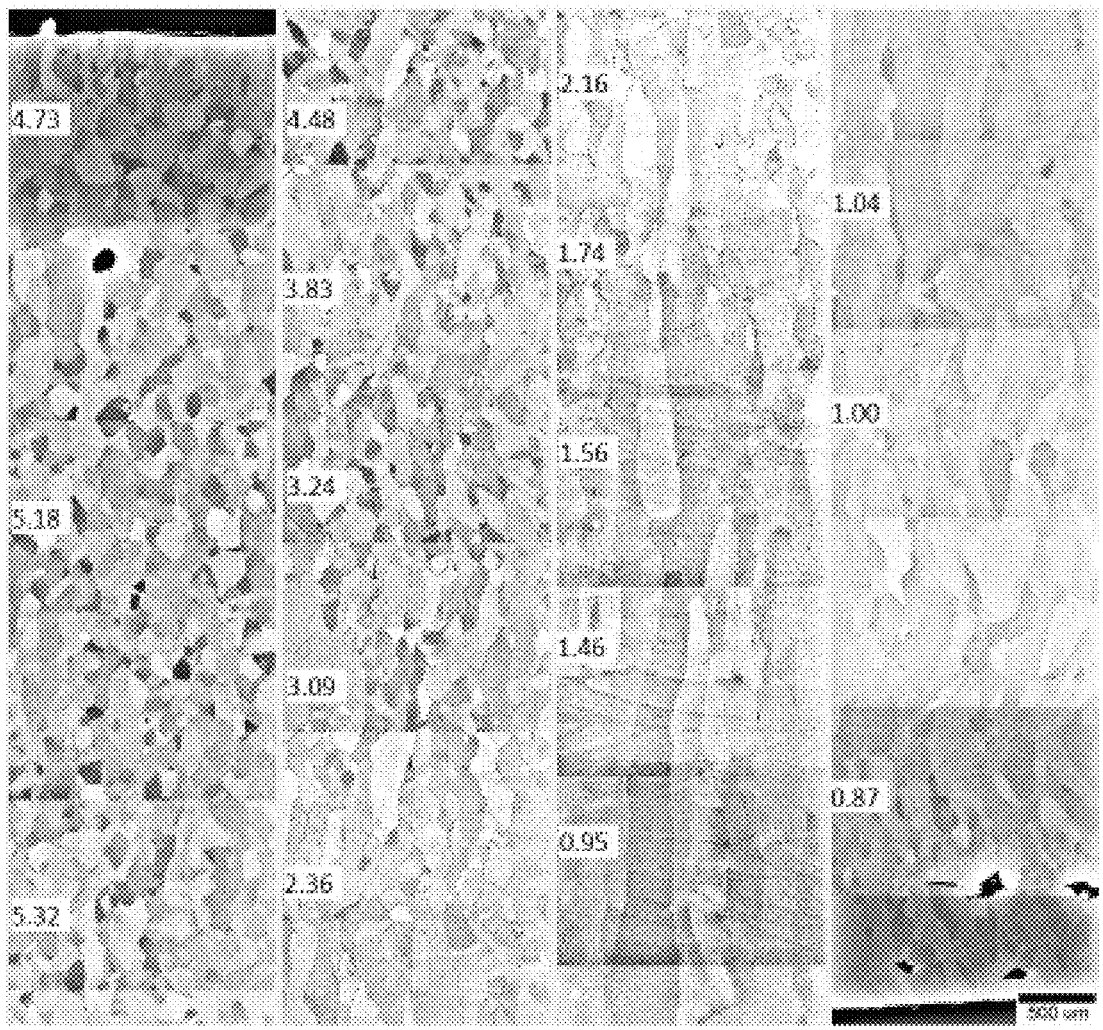
FIG. 3A shows the grain structure of a build formed by AM using a titanium alloy comprising Ti18 and varying amounts of iron (ranging from 0.87% by weight Fe to 5.32% by weight Fe).
Figure 3B:
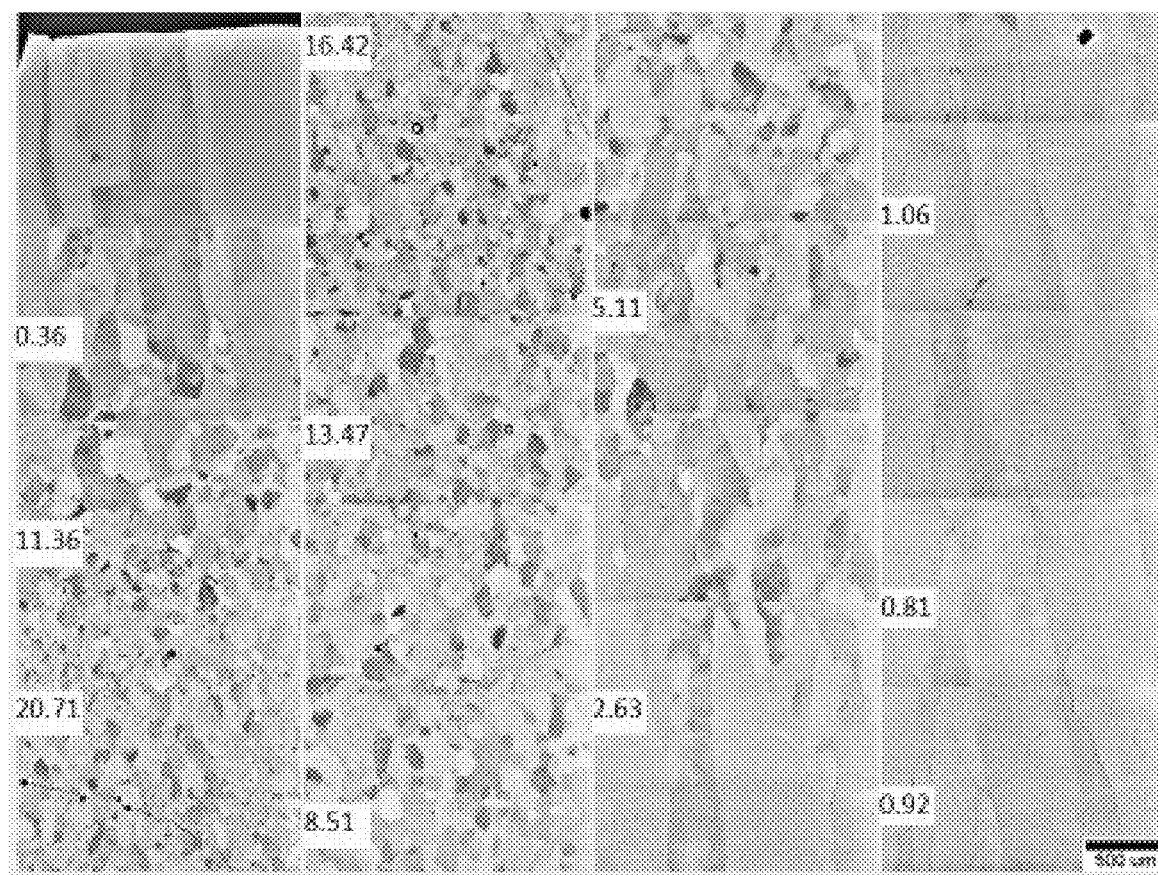
FIG. 3B shows the grain structure of a build formed by AM using a titanium alloy comprising Ti18 and varying amounts of iron (ranging from 0.36% by weight Fe to 20.71% by weight Fe).
Figure 3C:
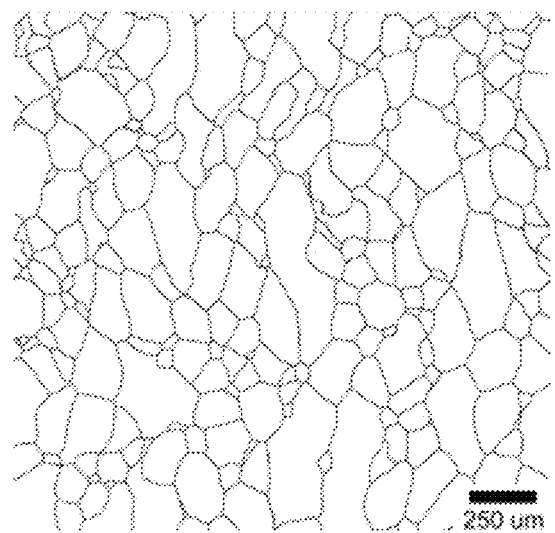
FIGS. 3C-3D shows line drawings of the grain boundaries of a portion of the build including 4.44% by weight iron.
Figure 3D:
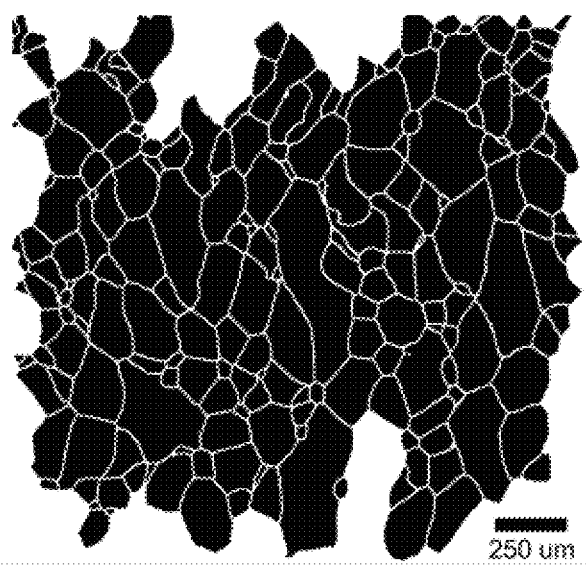

Builds was performed using Ti18 containing varying amounts of Fe. The resulting grain structures are shown in FIGS. 3A and 3B. When low quantities of Fe were present, columnar grains were formed. The addition of increasing amounts of Fe to Ti18 produced an equiaxed grain structure along the build direction.

Figure 4A:
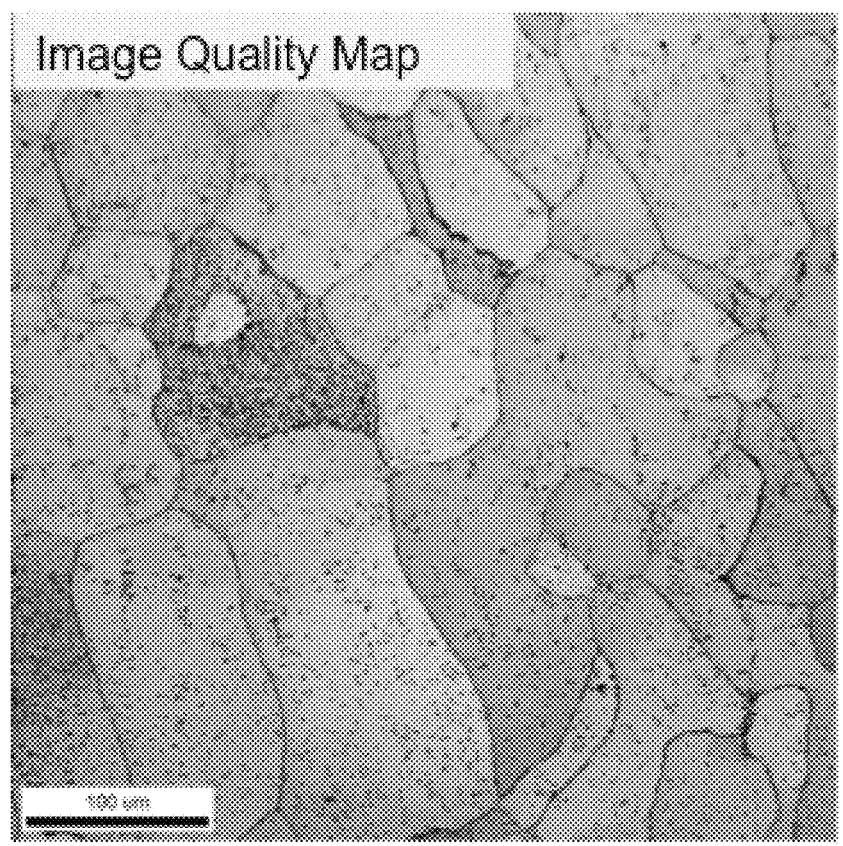
FIG. 4A is an EBSD image quality map showing the grain boundaries in a build formed by AM using Ti18+Fe.
Figure 4B:
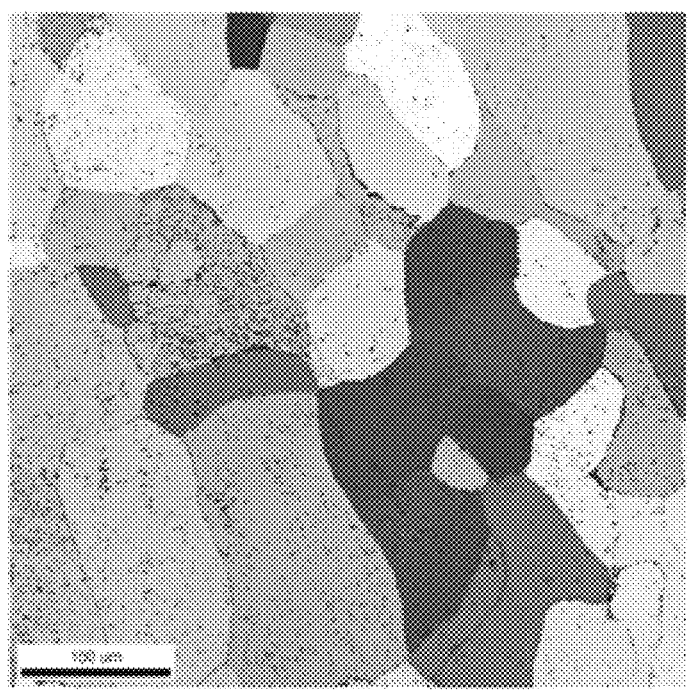
FIG. 4B is an inverse pole figure map showing the orientation of the grains parallel to the build direction in a build formed by AM using Ti18+Fe.
Figure 4C:
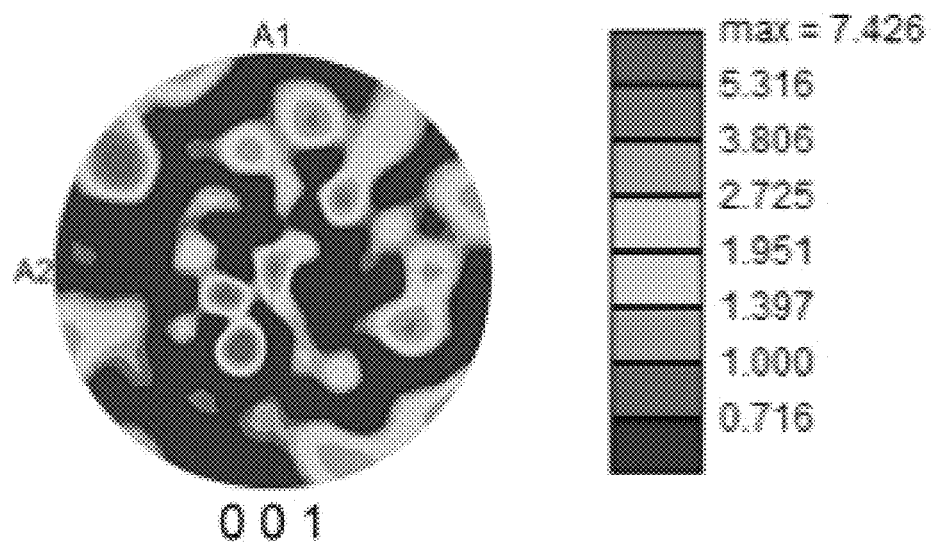
FIG. 4C is a pole figure showing the reduction in texture due to the breakdown of the columnar grains (as an equiaxed grain structure is formed) in a build formed by AM using Ti18+Fe.

Electron-backscattered diffraction (EBSD) analysis was also performed on the Ti18 plus iron sample. FIG. 4A is an image quality map showing the grain boundaries. FIG. 4B is an inverse pole figure (IPF) map of the selected area. FIG. 4C shows the pole figure (PF) of the scanned area with a times random value of 7.426, which is less than the Ti18 as-deposited times random value of 28.6. This indicates that the columnar structure has broken down upon the addition of iron, and an equiaxed structure has now formed.

The grain structure of an equiaxed region of the build was analyzed statistically. The results are included in the table below.

| Alloy Composition (wt %) | | | | | | Total Grains Counted | Aspect Ratio Average (St. Dev) | Above 3:1 Grains (%) | Above 4:1 Grains (%) | Above 5:1 Grains (%) | Above 6:1 Grains (%) |
|---|---|---|---|---|---|---|---|---|---|---|---|
| Ti | Al | Mo | V | Cr | Fe | | | | | | |
| Ti18 + Fe 78.28 | 5.71 | 3.81 | 5.53 | 2.23 | 4.44 | 207 | 1.89 (0.75) | 17 (8.2%) | 7 (3.4%) | 1 (0.5%) | 0 (0%) |

Ti18+Copper and Ti18+Nickel

Figure 5:
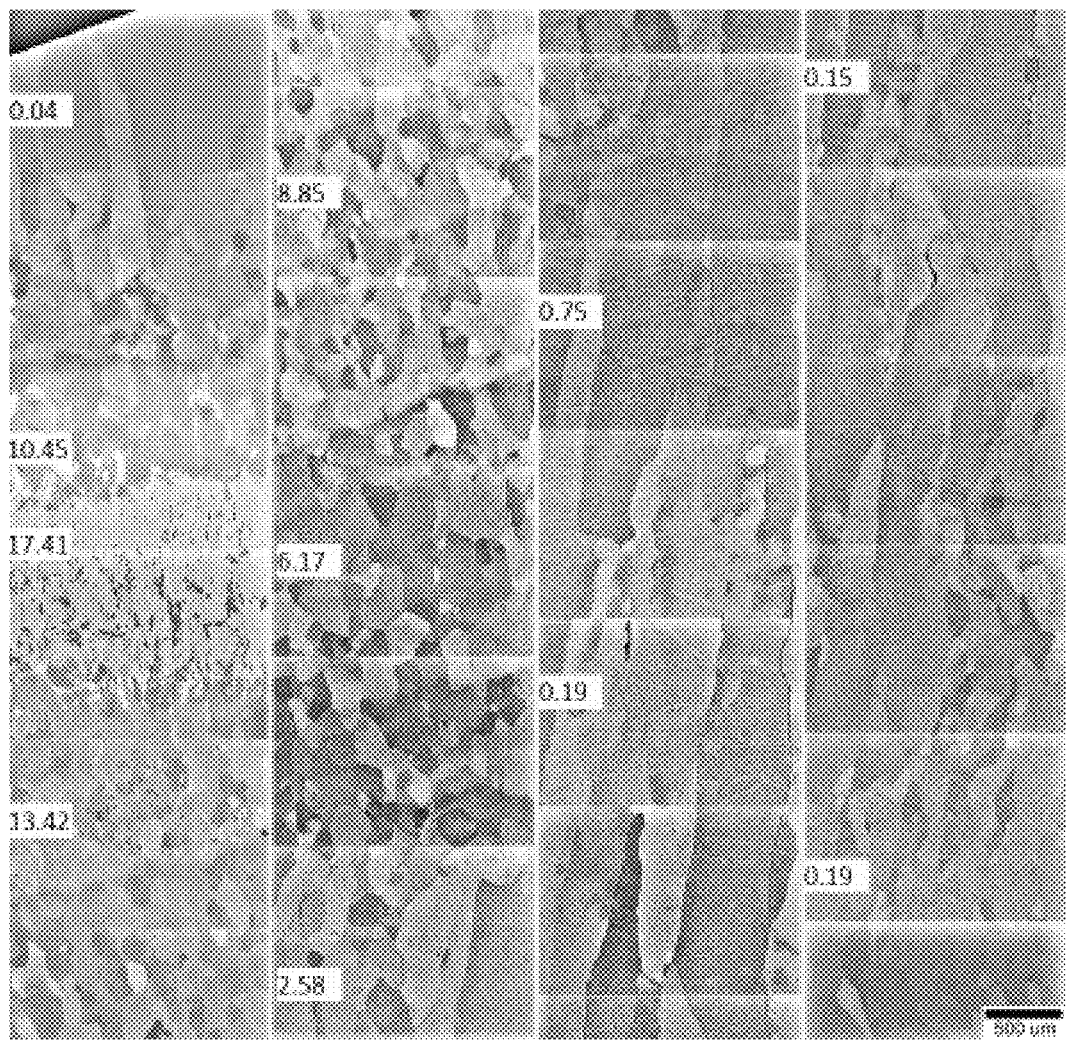
FIG. 5 shows the grain structure of a build formed by AM using a titanium alloy comprising Ti18 and varying amounts of copper (ranging from 0.04% by weight Cu to 17.41% by weight Cu).

Builds was performed using Ti18 containing varying amounts of Cu (see FIG. 5). The addition of copper to Ti18 also promoted an equiaxed grain structure. A transition from equiaxed grains back to columnar grains can be seen near the top of the build at the transition from Ti18 plus copper to only Ti18.

Figure 6A:
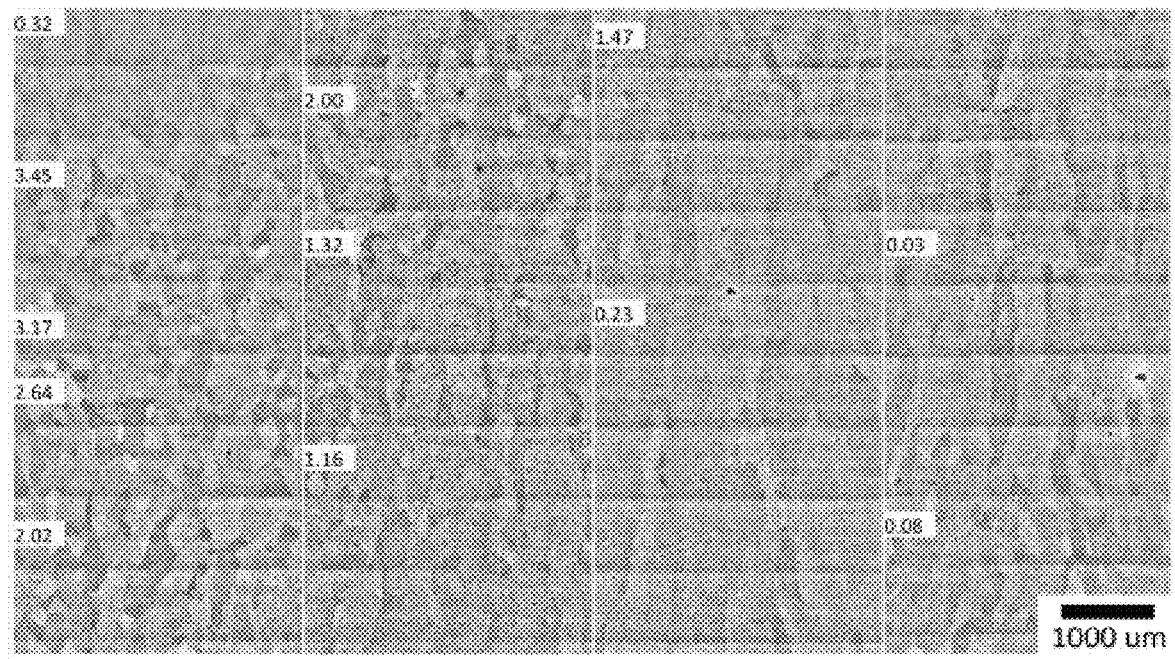
FIG. 6A shows the grain structure of a build formed by AM using a titanium alloy comprising Ti18 and varying amounts of nickel (ranging from 0.08% by weight Ni to 3.45% by weight Ni).
Figure 6B:
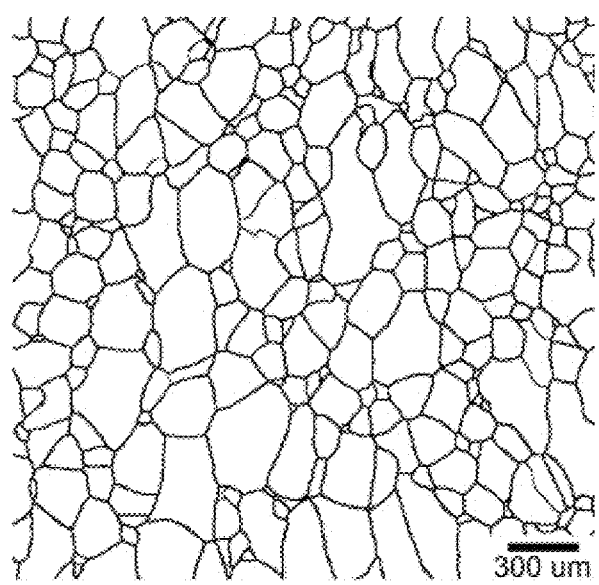
FIGS. 6B-6C shows line drawings of the grain boundaries of a portion of a build including Ti18+2.41% by weight nickel.
Figure 6C:
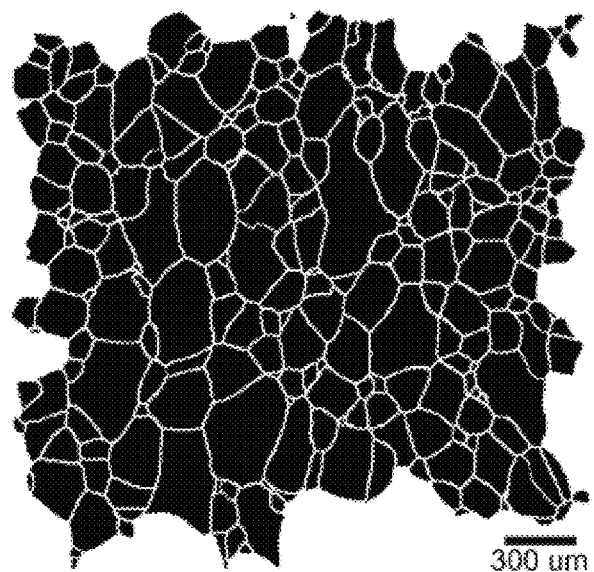
Figure 7A:
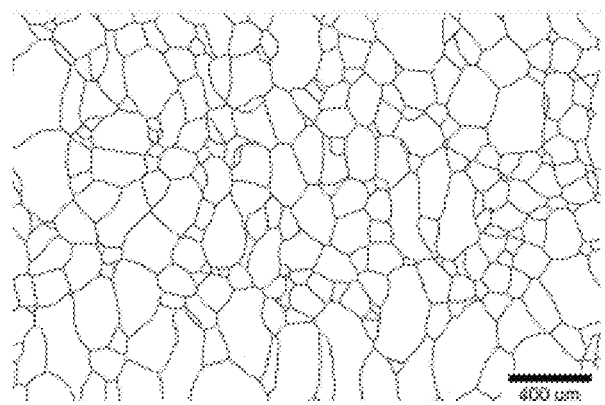
FIGS. 7A-7L show line drawings of the grain boundaries of portions of builds including Ti64+varying amounts of beta eutectoid stabilizer (Fe, Ni, or Cu). In these cases, equiaxed grain structures were observed.
Figure 7B:
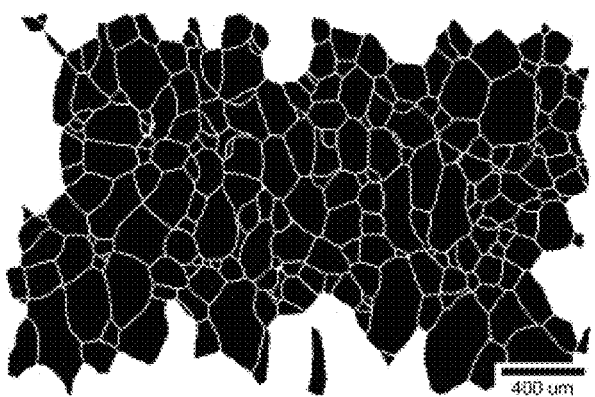
Figure 7C:
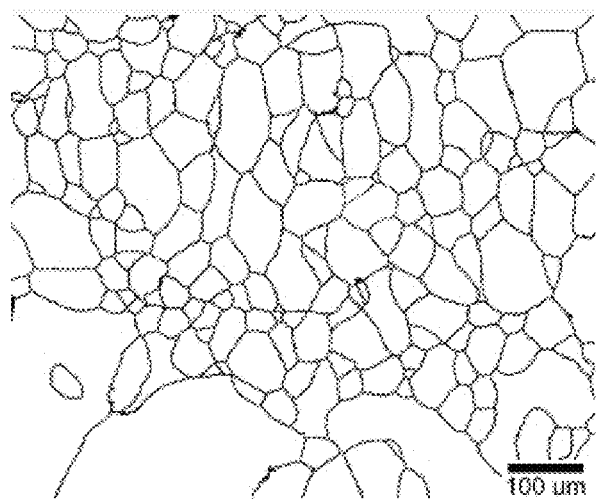
Figure 7D:
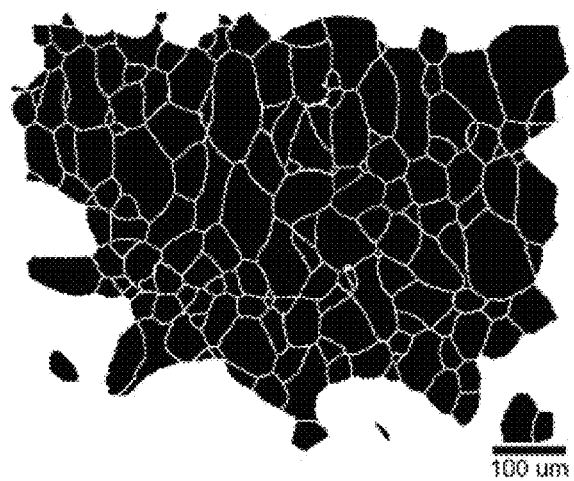
Figure 7E:
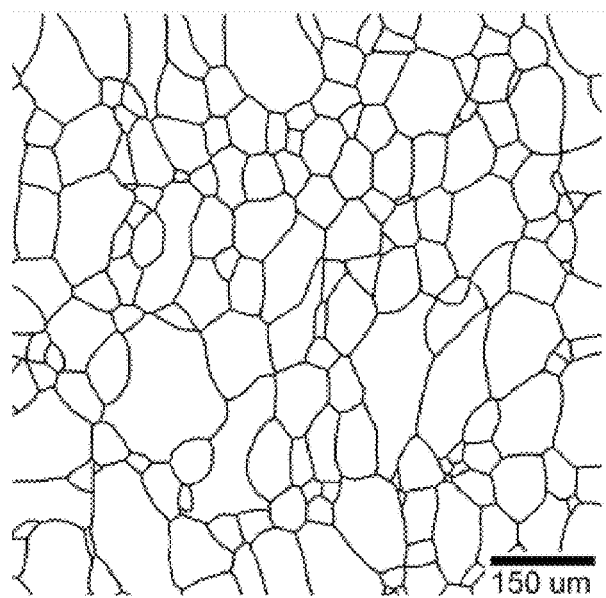
Figure 7F:
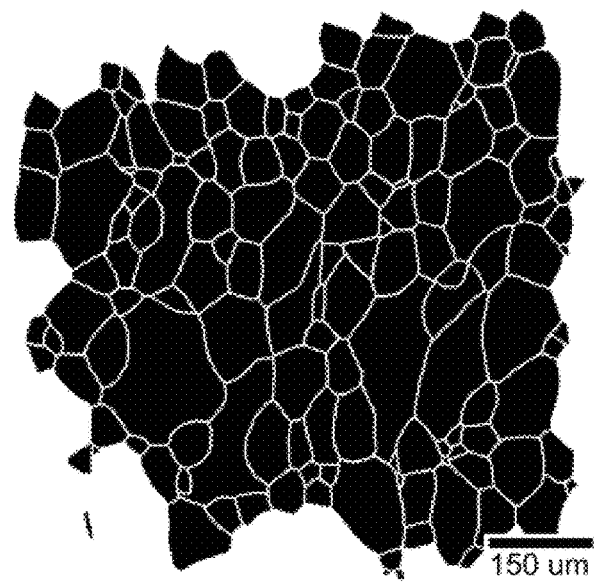
Figure 7G:
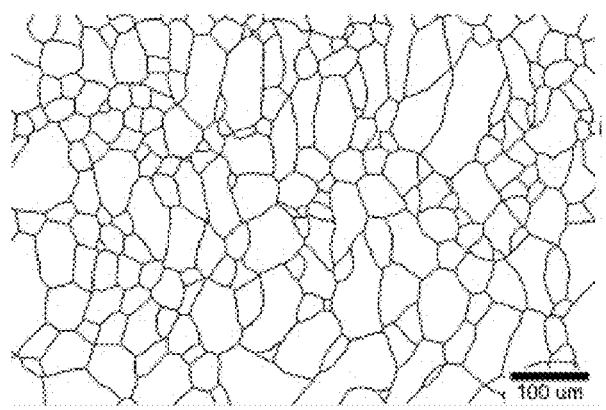
Figure 7H:
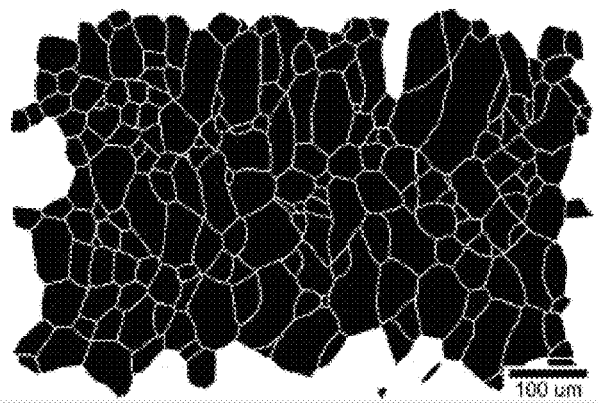
Figure 7I:
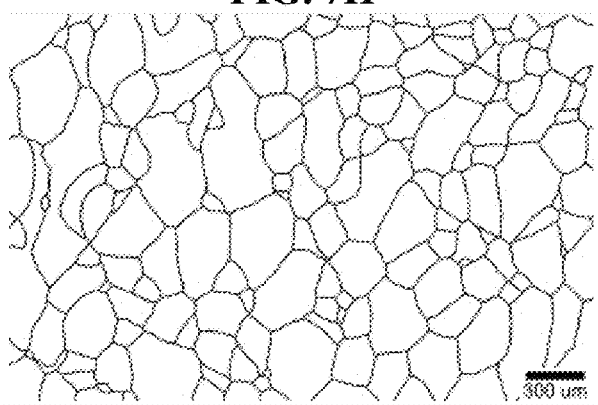
Figure 7J:
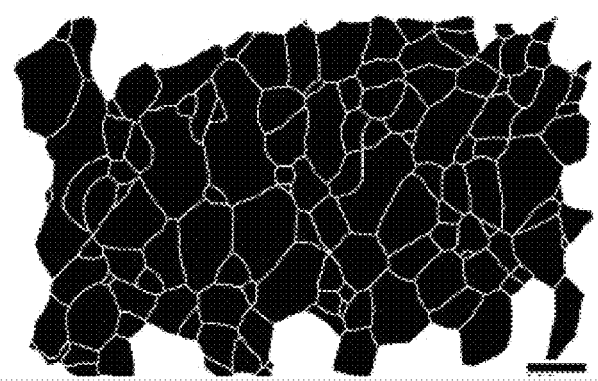
Figure 7K:
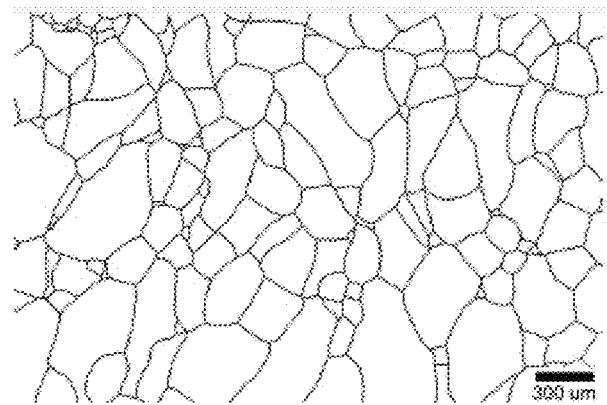
Figure 7L:
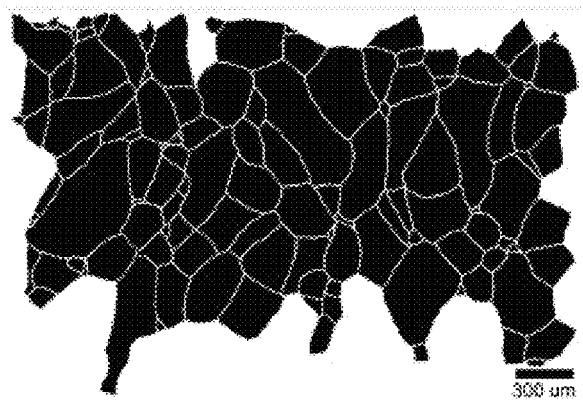

A similar build was conducted using Ti18 containing varying amounts of Ni (see FIG. 6A). FIG. 6B shows a line drawing of the grain boundaries of a portion of a build including Ti18+2.41% by weight nickel. The structure appeared equiaxed. The grain structure of the region of the build was analyzed statistically. The results are included in the table below.

|  | Alloy Composition (wt %) | | | | | | | Total Grains Counted | Aspect Ratio Average (St. Dev) | Above 3:1 Grains (%) | Above 4:1 Grains (%) | Above 5:1 Grains (%) | Above 6:1 Grains (%) |
|---|---|---|---|---|---|---|---|---|---|---|---|---|---|
|  | Ti | Al | Mo | V | Cr | Fe | Ni |  |  |  |  |  |  |
| Ti18 + Ni | 79.53 | 5.64 | 3.82 | 5.58 | 2.25 | 0.77 | 2.41 | 242 | 1.80 (0.68) | 14 (5.8%) | 4 (1.7%) | 1 (0.4%) | 0 (0%) |

Ti64+Beta Eutectoid Stabilizer

Builds was performed using Ti64 containing varying amounts of a beta eutectoid stabilizer (Fe, Ni, or combinations thereof). FIGS. 7A-7F show line drawings of the grain boundaries of portions of these builds. The grain structure of regions of these builds were analyzed statistically and were found to be equiaxed. The results are included in the table below.

|  | Alloy Composition (wt %) | | | | | Total Grains Counted | Aspect Ratio Average (St. Dev) | Above 3:1 Grains (%) | Above 4:1 Grains (%) | Above 5:1 Grains (%) | Above 6:1 Grains (%) |
|---|---|---|---|---|---|---|---|---|---|---|---|
|  | Ti | Al | V | Fe | Ni |  |  |  |  |  |  |
| Ti64 + Ni | 86.22 | 6.3 | 4 | 0 | 3.47 | 147 | 1.74 (0.69) | 6 (4.1%) | 3 (2.0%) | 1 (0.7%) | 1 (0.7%) |
| Ti64 + Ni | 83.58 | 5.99 | 4.09 | 0 | 6.33 | 204 | 1.75 (0.66) | 12 (5.9%) | 3 (1.5%) | 1 (0.5%) | 0 (0%) |
| Ti64 + Fe | 84.14 | 5.89 | 4.06 | 5.90 | 0 | 235 | 1.85 (1.01) | 19 (8.1%) | 13 (5.5%) | 4 (1.7%) | 3 (1.3%) |
| Ti64 + Fe | 82.77 | 5.79 | 4.01 | 7.43 | 0 | 169 | 1.77 (0.63) | 10 (5.9%) | 2 (1.2%) | 0 (0%) | 0 (0%) |
| Ti64 + Fe and Ni | 83.96 | 6.06 | 4.18 | 3.52 | 2.27 | 133 | 1.80 (0.61) | 6 (4.5%) | 1 (0.8%) | 0 (0%) | 0 (0%) |
| Ti64 + Fe and Ni | 81.59 | 5.93 | 4.12 | 5.30 | 3.06 | 126 | 1.93 (0.77) | 12 (9.5%) | 5 (4.0%) | 1 (0.8%) | 0 (0%) |

CP Ti+Beta Eutectoid Stabilizer

Figure 8A:
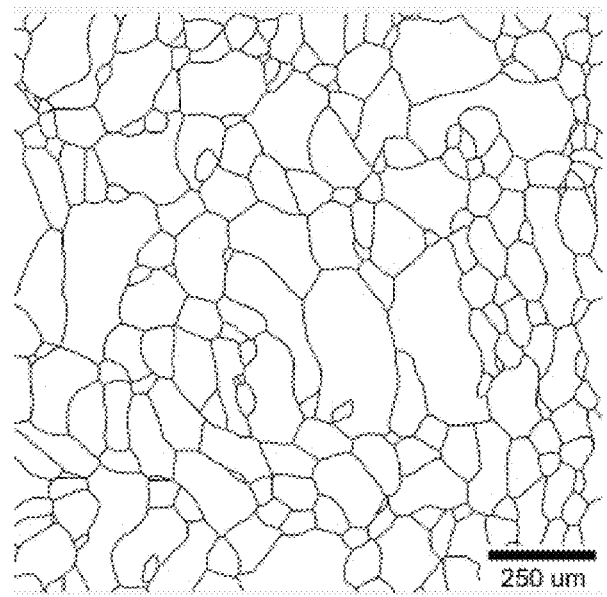
FIGS. 8A-8F show line drawings of the grain boundaries of portions of builds including CP Ti+varying amounts of beta eutectoid stabilizer (Fe or Fe and Ni). In these cases, equiaxed grain structures were observed.
Figure 8B:
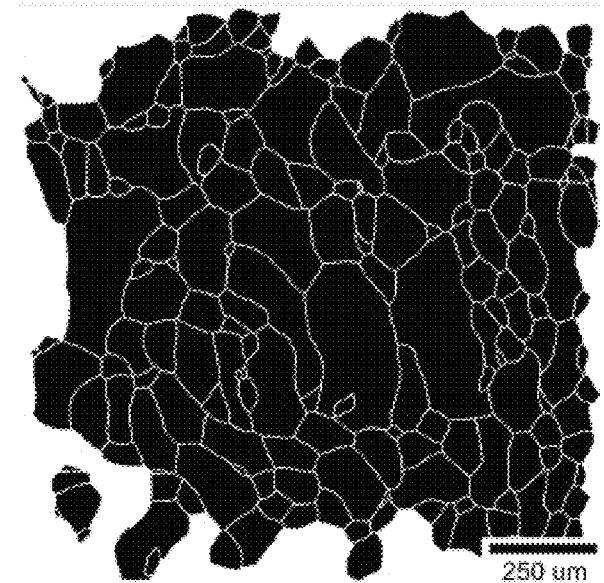
Figure 8C:
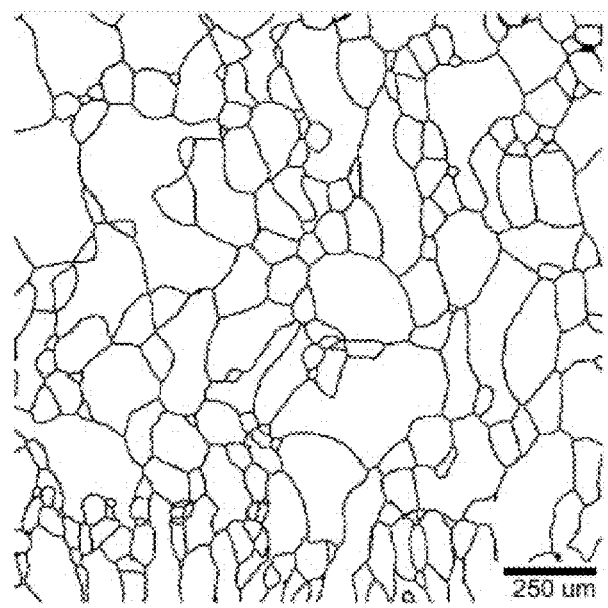
Figure 8D:
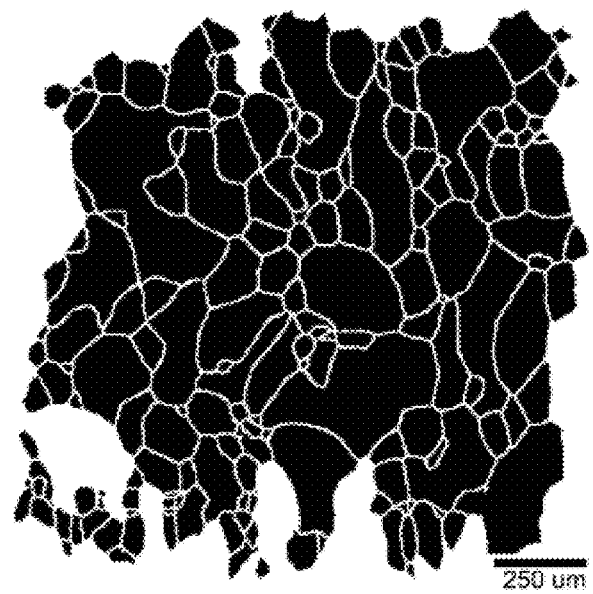
Figure 8E:
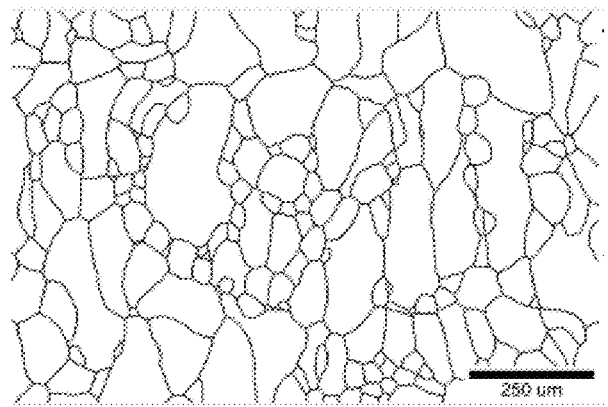
Figure 8F:
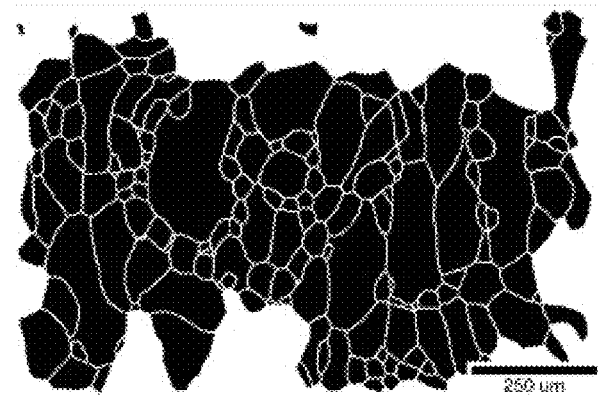

Builds was performed using CP Ti containing varying amounts of a beta eutectoid stabilizer (Fe or a combination of N). FIGS. 8A-8C show line drawings of the grain boundaries of portions of these builds. The grain structure of regions of these builds were analyzed statistically and were found to be equiaxed. The results are included in the table below.

| | Alloy Composition (wt %) | | | Total Grains Counted | Aspect Ratio Average (St. Dev) | Above 3:1 Grains (%) | Above 4:1 Grains (%) | Above 5:1 Grains (%) | Above 6:1 Grains (%) |
|---|---|---|---|---|---|---|---|---|---|
| | Ti | Fe | Ni | | | | | | |
| CP Ti + Fe | 92.25 | 7.75 | 0 | 202 | 1.92 (0.84) | 17 (8.4%) | 8 (4.0%) | 3 (1.5%) | 1 (0.5%) |
| CP Ti + Fe and Ni | 93.65 | 4.35 | 2.0 | 168 | 2.00 (0.82) | 19 (11.3%) | 6 (3.6%) | 1 (0.6%) | 0 (0%) |

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A method of forming an object via an additive manufacturing process, the method comprising:
   applying energy to a first quantity of a powdered titanium alloy on a substrate, thereby melting or sintering the powdered titanium alloy so as to fuse particles of the powdered titanium alloy into a first layer on the substrate, wherein the powdered titanium alloy comprises a titanium material and a beta eutectoid stabilizer,
   wherein the beta eutectoid stabilizer is present in an effective amount to produce an equiaxed grain structure when the powdered titanium alloy is melted or sintered during the additive manufacturing process; and
   forming at least one additional layer on the first layer by applying energy to at least a second quantity of the powdered titanium alloy on the first layer so as to fuse particles of the powdered titanium alloy into the at least one additional layer on the first layer, thereby forming the object,
   wherein the beta eutectoid stabilizer is present in an amount of from 6% to 20% by weight, based on the total weight of the titanium alloy;
   wherein when the beta eutectoid stabilizer is Fe, the Fe is present in an amount of from greater than 6% to 15% by weight, based on the total weight of the titanium alloy;
   wherein the object exhibits an average grain aspect ratio of less than 2.5; and
   wherein the object comprises grains, and wherein at least 85% of the grains have an aspect ratio of less than 3:1.

2. The method of claim 1, wherein the additive manufacturing process comprises selective laser melting (SLM), selective laser sintering (SLS), electron beam melting (EBM), or electron beam sintering (EBS).

3. The method of claim 1, wherein the titanium alloy is in the form of a population of particles having an average particle size of less than about 250 microns.

4. The method of claim 3, wherein the titanium alloy is in the form of a population of particles having an average particle size of from 5 microns to 200 microns.

5. The method of claim 1, wherein the beta eutectoid stabilizer is chosen from Fe, Ni, Cu, or a combination thereof.

6. The method of claim 1, wherein the beta eutectoid stabilizer comprises Cu, and wherein the Cu is present in an amount of from 3.5% to 10% by weight, based on the total weight of the titanium alloy.

7. The method of claim 1, wherein the beta eutectoid stabilizer comprises Ni, and wherein the Ni is present in an amount of from 2% to 12% by weight, based on the total weight of the titanium alloy.

8. The method of claim 1, wherein the titanium material comprises at least 75% by weight titanium, based on the total weight of the titanium material.

9. The method of claim 1, wherein the titanium material is commercially pure titanium.

10. The method of claim 1, wherein the titanium material is a titanium alloy chosen from Ti64 (Ti-6Al-4V), Ti18 (Ti-5.5Al-5Mo-5V-2.3Cr-0.8Fe), or a combination thereof.

* * * * *